(No Model.)
F. C. BEARD.
FACE PLATE FOR LATHES, &c.
No. 282,038. Patented July 31, 1883.
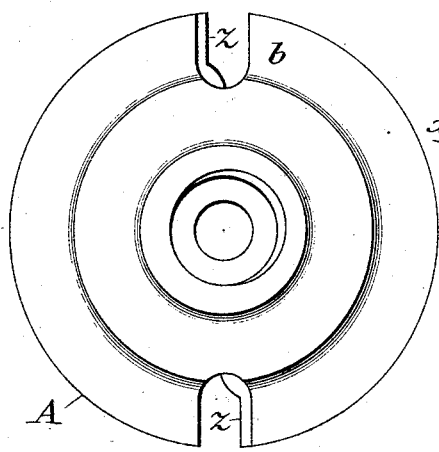
Fig. 1.
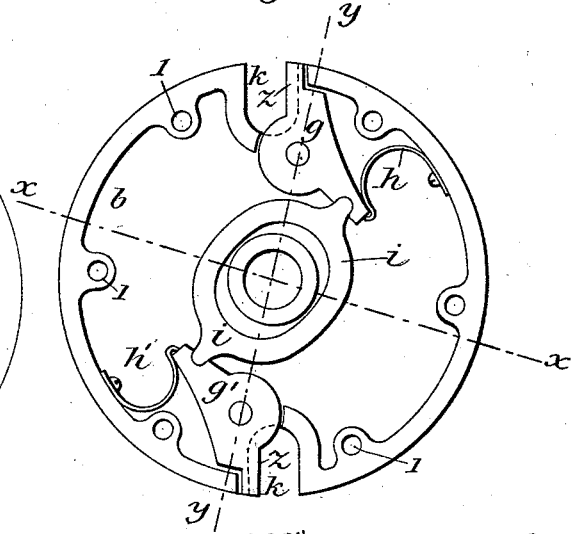
Fig. 2.
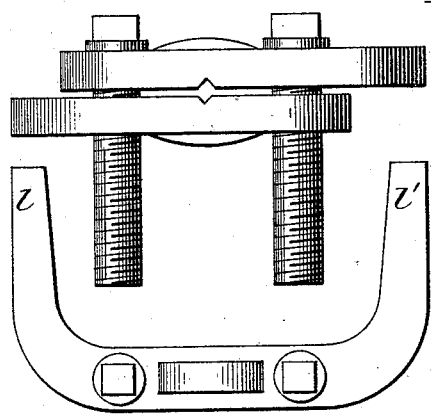
Fig. 5.
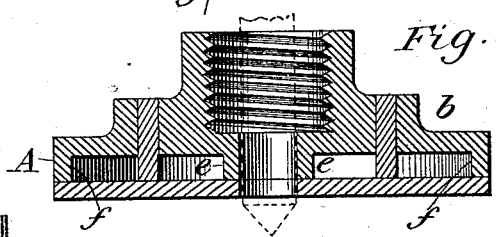
Fig. 3.
Fig. 4.
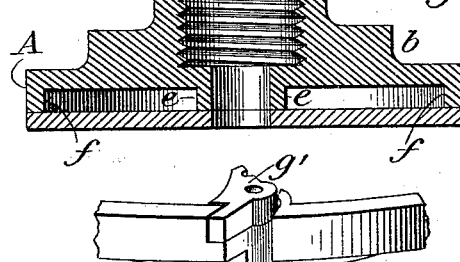
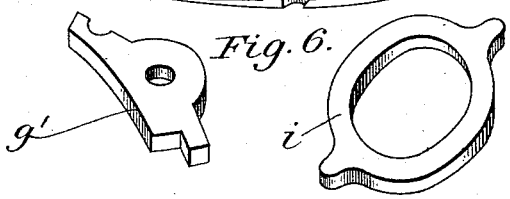
Fig. 6.
Witnesses:
Guy De Mott
Paul D Sullivan
Inventor:
Frederick C. Beard
by John J. Halsted & Son
his Attys.

UNITED STATES PATENT OFFICE.

FREDERICK C. BEARD, OF AURORA, ILLINOIS.

FACE-PLATE FOR LATHES, &c.

SPECIFICATION forming part of Letters Patent No. 282,038, dated July 31, 1883.

Application filed April 4, 1883. (No model.)

*To all whom it may concern:*

Be it known that I, FREDERICK C. BEARD, of Aurora, in the county of Kane and State of Illinois, have invented certain new and useful Improvements in Face-Plates for Lathes, Boring-Machines, &c.; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvements consist in a special construction of face-plate, readily understood from the following description. This face-plate is intended for use in lathes, boring-machines, &c., and, in fact, wherever the work to be turned or bored is driven by a "dog," clamp, or driver fastened to the face-plate.

The object is to provide means whereby the work—say, for instance, a shaft—may be driven from two sides, instead of from one only, as is the case when driven in the usual manner—that is, with a lathe-dog—and to provide the face-plate with self-adjusting spring-levers, the construction preventing the dog from twisting around and becoming loose, and avoiding all damage and inconvenience resulting therefrom, and also preventing all "chattering" and trembling of the shaft.

Figure 1 is a plan view of a face-plate embodying my improvements; Fig. 2, a plan of its interior construction, showing its levers and their springs; Fig. 3, a cross-section through the line $x\,x$ of Fig. 2; Fig. 4, a similar section through line $y\,y$ of Fig. 2; Fig. 5, views of the dog, clamp, driver, or carrier; and Fig. 6, details.

A represents the face-plate, which is made in two parts, $b\,c$, the part $b$ having a suitable hub, with an interior thread, if desired, and also having an exterior and an interior rim, (marked $e$ and $f$, respectively,) or other equivalent provision, to afford a space between the parts $b$ and $c$ for the levers $g\,g'$ and their springs $h\,h'$, and a suitable yoke or connecting piece, $i$. The parts $b$ and $c$ are secured together by screws at 1 1, &c., or otherwise, in any suitable manner.

At opposite sides of the face-plate are deep recesses, $k\,k'$, adapted to receive the two projections $l\,l'$ of the dog, clamp, or carrier. (See Fig. 5.) These projections should be diametrically opposite each other, in order to accord with the relative positions of the recesses $k\,k'$, and also with the self-adjusting levers $g\,g'$, these levers being so located and arranged that their outer arms may by the pressure of the yoke $i$ be projected into the recesses $k$ and $k'$, respectively, as shown in Figs. 1 and 2 at $z$. The depth of the recesses $k\,k'$ is such that, whenever desired, the clamp or driver may be set considerably to one side of the center of the face-plate—that is, eccentrically relatively to it; but yet even when this is done the range of adjustment afforded is such that the self-adjusting levers $g$ $g'$ will always bear with equal pressure upon both of the projections $l\,l'$, thus insuring two equally steady driving-points, and without twist and without strain of parts or chattering.

It will be observed that the faces $z$ of these levers are substantially parallel with the opposite faces of the respective recesses $k\,k'$, into which they project, so that the pressure of the levers upon the projections $l\,l'$ of the clamp-driver will be equal, notwithstanding this driver be set eccentrically.

The yoke or piece $i$ transmits motion from one lever to the other—that is, when one lever presses against the tail of the dog or clamp, in starting the lathe, that lever will at once recede, and thus by the agency of the yoke its power or motion will be transmitted to the other lever, causing it to advance into the recess and press upon the other tail of the dog or clamp, and in this way driving from two opposite sides; and even though the tails of the clamp be in an eccentric position relative to the center of the face-plate, still the levers will press with equal force upon the tails, and these may be eccentric up to the limit permitted by the slots or recesses in the face-plate.

By my construction I avoid all the practical disadvantages incident to fastening a dog to a shaft by a single set-screw, or those consequent upon having but one tail or shank to the dog, and communicating power from the face-plate to this tail, and at one point only, it being well known that in this last-mentioned construction the shaft will spring and tremble and chatter, and if the dog is a little too large for the shaft it will very often twist around and become loose, and although the shaft may have ceased to revolve, the lathe will still keep going, and then the cutting-tool is apt to break off and the shaft is spoiled; but driving, as I do, in my improved device, from two opposite points, such torsion and such ill consequences cannot ensue.

The levers render the device self-adjusting; or, in other words, these levers, in conjunction with their springs, automatically adjust themselves, and thereby the face-plate automatically holds itself in proper and steady relation to the clamp-driver.

I claim—

1. A face-plate for lathes, boring-machines, &c., having radial recesses $k\ k'$, diametrically opposite each other, in combination with yielding and self-adjusting levers $g\ g'$ thereon, each adapted to project into its adjacent recess, as and for the purposes set forth.

2. In combination with the face-plate having the radial recesses $k\ k'$, the levers $g\ g'$, and their respective reacting springs, and their connecting piece or yoke $i$, operating as set forth.

3. The described face-plate for lathes, boring-machines, &c., consisting of the parts $b$ and $c$, each having a radial recess therein, the spring-levers $g\ g'$, and the yoke $i$, the whole arranged and operating substantially as shown and described.

FREDERICK C. BEARD.

Witnesses:
JOHN C. MURPHY,
A. J. KING.